United States Patent
Parhami et al.

(10) Patent No.: US 7,609,917 B2
(45) Date of Patent: Oct. 27, 2009

(54) METHOD AND APPARATUS FOR CONTROLLING WAVEGUIDE BIREFRINGENCE BY SELECTION OF A WAVEGUIDE CORE WIDTH FOR A TOP CLADDING

(75) Inventors: Farnaz Parhami, Fremont, CA (US); Liang Zhao, Sunnyvale, CA (US); Fan Zhong, Fremont, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 0 days.

(21) Appl. No.: 12/079,930

(22) Filed: Mar. 28, 2008

(65) Prior Publication Data

US 2008/0240655 A1     Oct. 2, 2008

Related U.S. Application Data

(63) Continuation of application No. PCT/US2005/036628, filed on Oct. 11, 2005.

(51) Int. Cl.
  *G02B 6/12* (2006.01)
  *G02B 6/10* (2006.01)
  *G02B 6/34* (2006.01)
(52) U.S. Cl. ............................ 385/14; 385/37; 385/129; 385/131
(58) Field of Classification Search ................. None
  See application file for complete search history.

(56) References Cited

U.S. PATENT DOCUMENTS

| | | |
|---|---|---|
| 5,195,161 A | 3/1993 | Adar et al. |
| 5,341,444 A | 8/1994 | Henry et al. |
| 5,408,569 A * | 4/1995 | Nishimoto ................. 385/132 |
| 5,467,418 A | 11/1995 | Dragone |

(Continued)

FOREIGN PATENT DOCUMENTS

EP     1191364 A1     3/2002

(Continued)

OTHER PUBLICATIONS

Inoue et al., "Novel birefringence compensating AWG design," Optical Society of America, WB4-1-WB4-3. Paper appears in OFC 2001, vol. 3.

(Continued)

*Primary Examiner*—Tina M Wong
(74) *Attorney, Agent, or Firm*—Dardi & Associates, PLLC

(57) ABSTRACT

A method and apparatus for controlling waveguide birefringence by selection of a waveguide core width for a tuned top clad is described herein. In one example, a dopant concentration within a top cladding material is between 3-6% (wt.). Given a tuned top cladding composition, a width of the waveguide core is pre-selected such that birefringence is minimized, i.e., a zero, or near zero. The desirable width of the waveguide core is determined by calculating the distribution of stress in the top cladding over a change in temperature. From this distribution of stress, a relationship between the polarization dependent wavelength and variable widths of the waveguide in the arrayed waveguide grating are determined. This relationship determines a zero value, or near zero value, of polarization dependent wavelength for a given range of waveguide widths. Accordingly, the width of the waveguide may be selected such that the polarization dependent wavelength is minimized.

20 Claims, 3 Drawing Sheets

U.S. PATENT DOCUMENTS

| | | | |
|---|---|---|---|
| 5,623,571 | A | 4/1997 | Chou et al. |
| 5,745,618 | A | 4/1998 | Li |
| 5,751,872 | A | 5/1998 | Bissessur et al. |
| 5,768,450 | A | 6/1998 | Bhagavatula |
| 5,841,919 | A | 11/1998 | Akiba et al. |
| 5,901,259 | A | 5/1999 | Ando et al. |
| 5,930,439 | A | 7/1999 | Ojha et al. |
| 5,940,555 | A | 8/1999 | Inaba et al. |
| 5,982,960 | A | 11/1999 | Akiba et al. |
| 6,137,939 | A | 10/2000 | Henry et al. |
| 6,181,848 | B1 | 1/2001 | Bruno et al. |
| 6,201,918 | B1 | 3/2001 | Berkey et al. |
| 6,205,273 | B1 | 3/2001 | Chen |
| 6,396,988 | B1 * | 5/2002 | Shimoda .................... 385/129 |
| 6,553,170 | B2 | 4/2003 | Zhong et al. |
| 6,580,864 | B1 | 6/2003 | Temkin et al. |
| 6,704,487 | B2 * | 3/2004 | Parhami et al. ............. 385/129 |
| 6,850,670 | B2 | 2/2005 | Parhami et al. |
| 6,865,308 | B1 * | 3/2005 | Conway et al. ............... 385/14 |
| 2002/0018636 | A1 * | 2/2002 | Bischel et al. ............. 385/140 |
| 2002/0122651 | A1 | 9/2002 | Roberts |
| 2002/0132386 | A1 | 9/2002 | Bazylenko |
| 2002/0181868 | A1 | 12/2002 | McGreer |
| 2003/0021513 | A1 | 1/2003 | Parhami et al. |

FOREIGN PATENT DOCUMENTS

| | | |
|---|---|---|
| JP | 7-230012 | 8/1995 |
| JP | 2001-051139 A | 2/2001 |
| WO | 2007044010 A1 | 4/2007 |

OTHER PUBLICATIONS

Kilian et al., "Birefringence Free Planar Optical Waveguide Made by Flame Hydrolysis Deposition (FHD) Through Tailoring of the Overcladding," Journal of Lightwave Technology, v. 18(2): 193-198 (2000).

Nadler et al., "Polarization Insensitive Low-Loss, Low-Crosstalk Wavelength Multiplexer Modules," IEEE Journal of Selected Topics In Quantum Electronics 5(5): 1407-1412 (1999).

Okamoto, Fundamentals of Optical Waveguides., pp. 346-381 (2000).

Vreeburg et al., "A Low-Loss 16 Channel Polarization Dispersion-Compensated PHASAR Demultiplexer," IEEE Photonics Technology Letters 10(3): 382-384 (1998).

Yamada et al., "Dispersion Resulting From Phase and Amplitude Errors in Arrayed-Waveguide Grating Multiplexers-Demultiplexers," Optic Letters 25(8): 569-571 (2000).

Zhong et al, "A comprehensive method to reduce PDW in arrayed-waveguide grating," Optical Fiber Communication Conference and Exhibit, 2002. OFC 2002, pp. 73-75.

* cited by examiner

METHOD AND APPARATUS FOR CONTROLLING WAVEGUIDE BIREFRINGENCE BY SELECTION OF A WAVEGUIDE CORE WIDTH FOR A TOP CLADDING

CROSS REFERENCE TO RELATED APPLICATIONS

This application is a continuation of copending PCT application PCT/US2005/036628 designating the U.S. to Parhami et al., filed on Oct. 11, 2005, entitled "Method and Apparatus for Controlling Waveguide Birefringence by Selection of a Waveguide Core Width for a Top Cladding," incorporated herein by reference.

TECHNICAL FIELD

The present invention relates generally to methods and apparatus for controlling waveguide birefringence. More particularly, the present invention relates to controlling waveguide birefringence by the selection of a waveguide core width for a given top cladding.

BACKGROUND

The increase in internet traffic and other telecommunications over the past several years has caused researchers to explore new ways to increase fiber optic network capacity by carrying multiple data signals concurrently through telecommunications lines. To expand fiber network capacity, fairly complex optical components have already been developed for wavelength division multiplexing (WDM) and dense wavelength division multiplexing (DWDM).

Planar lightwave circuit (PLC) technology is one technology that may be used to implement optical wavelength routers. In a PLC, light is restricted to propagate in a region that is thin in two dimensions, referred to herein as the transverse dimension and the lateral dimension, and extended in the other dimension, hi a conventional PLC, a core layer typically lies between a top cladding layer and a bottom cladding layer and channel waveguides are often formed by at least partially removing (typically through an etching process) core material beyond the transverse limits of the channel waveguide and replacing it with at least one layer of side cladding material that has an index of refraction that is lower than that of the core material. The side cladding material is usually the same material as the top cladding material.

Each layer is typically doped in a manner such that the core layer has a higher index of refraction than either the top cladding or bottom cladding. When layers of silica glass are used for the optical layers, the layers are typically deposited on a silicon wafer. Deposition processes include chemical vapor deposition (CVD), low pressure chemical vapor deposition (LPCVD), and/or plasma-enhanced CVD (PECVD). Moreover, one or more of the optical layers of the slab waveguide and/or channel waveguide may comprise an optically transparent polymer. For example, spin coating is one known film deposition method. A doped-silica waveguide is usually preferred because it has a number of attractive properties including low cost, low loss, low birefringence, stability, and compatibility for coupling to fiber.

The arrayed-waveguide grating router (AWGR) is an example of an integrated optical router. An AWGR is a PLC having at least one input channel waveguide, an input planar waveguide, an arrayed-waveguide grating (AWG), an output planar waveguide, and at least one output channel waveguide. Alternatively, an AWGR may comprise a plurality of output waveguides and a plurality of input waveguides. AWGRs may be configured to perform a variety of functions, for instance, they may function as multiplexers, demultiplexers, or they may be configured to perform both functions.

One aspect of performance that is affected by the present invention is referred to as polarization dependent wavelength (PDW). This term, as well as a number of related terms, will now be defined. Spectral transmissivity (in units of dB) is defined as the optical power (in units of dBm) of substantially monochromatic light that emerges from the fiber that is coupled to the input port minus the optical power (in units of dBm) of the light that enters the optical fiber that is coupled to the output port of the optical router. Spectral transmissivity is a function of the selected input port, the selected output port, the optical wavelength, and the polarization state of the incident light. When the incident light is in a polarization state called a "principal state of polarization," the light will be in the same polarization state when it emerges from the device. For purposes of illustration only, the principle states of polarization are assumed to be independent of wavelength, input port and output port. It is understood that the invention is not so limited by this assumption.

Again, for the purposes of illustration only, it will be assumed that the two principal states of polarization are the so-called transverse electric (TE) and transverse magnetic (TM) polarization states. The TE polarization state has an electric field that is predominantly aligned in the transverse direction and the TM polarization state has an electric field that is predominantly aligned in the lateral direction. Again, the invention is not so limited to devices having these principle states of polarization.

Typically, for values of spectral transmissivity that are larger than −10 dB, the TM spectral transmissivity is a replica of the TE spectral transmissivity that is shifted in wavelength by an amount that is referred to as the polarization dependent dispersion (PDD). PDD is positive if the TM spectral transmissivity has a maximum that has a longer wavelength than the maximum of the TE spectral transmissivity and is negative otherwise. PDW is defined as the absolute value of the PDD.

In many fiber optic communication systems, the polarization state of the light in the optical fiber may change in a manner that is uncontrolled and unpredictable. A change in the polarization state of the light in the fiber as it enters an AWG will cause a change in the optical power that emerges from the AWG that may be as large as the value of polarization dependent loss (PDL) for the AWG. There have been a number of techniques developed in an attempt to minimize PDW.

One approach to minimizing PDW involves selecting an optical layer design with minimum birefringence. In one example of this approach, U.S. Pat. No. 5,930,439 (Ojha et al.), which is incorporated herein by reference in its entirety, discloses a planar optical waveguide which reduces birefringence by doping the various optical layers so that the top cladding has a thermal coefficient of expansion that is close to the thermal expansion coefficient of the substrate.

Another approach is described in A. Kilian et al., Birefringence Free Planar Optical Waveguide Made by Flame Hydrolysis Deposition (FHD) Through Tailoring of the Overcladding, Journal of Lightwave Technology, v. 18, no. 2, p. 193 (2000), which is incorporated herein by reference in its entirety. Kilian discloses that because the thermal expansion of the top cladding largely determines the birefringence in the waveguide, a top cladding can be developed and made with a flame-hydrolysis-deposition (FHD) process to reduce the birefringence.

Many methods and apparatus attempt to formulate a top cladding material which reduces birefringence. However, this may require specific compositions for the top cladding. These techniques, as well as others, teach the application of a specific top cladding composition to reduce birefringence. However, there is a need for a reliable method to reduce the birefringence in a waveguide for varying top cladding compositions.

SUMMARY

The top cladding material which usually covers the waveguides and substrate in an arrayed waveguide grating may determine in large part the resulting birefringence. However, given a top cladding composition, a width of the waveguide core may be pre-selected that provides a minimized birefringence, i.e., a zero, or near zero, polarization dependent wavelength. A tuned top cladding is used to describe a pre-existing dopant concentration within a top cladding material.

In calculating the desired width of a waveguide core that provides the desired level of birefringence for a given tuned top cladding having a dopant in the range of 3-6% (by weight), the distribution of stress in the top cladding may be determined over a change in temperature. From this distribution of stress, a relationship may be determined between the polarization dependent wavelength and various widths of the waveguide in the arrayed waveguide grating. This relationship may determine a zero value, or near zero value, of polarization dependent wavelength for a given range of waveguide widths. PDW is a polarization dependent wavelength change and the wavelength change preferably ranges from about 0±0.03 nm for the present invention to be optimized. The width of the waveguide may be selected such that the polarization dependent wavelength is minimized accordingly.

In one example, waveguides and methods for manufacturing waveguides described include a top cladding layer having a dopant in the range of 3-6% by weight. It has been found that this particular dopant range provides desirable manufacturing characteristics, for example.

DETAILED DESCRIPTION

The top cladding material which usually covers the waveguides and substrate may determine in large part the resulting birefringence. However, given a top cladding composition, a width of the waveguide core may be preselected that provides a desired birefringence. A top cladding which is "tuned" is used to describe a pre-existing dopant concentration within a top cladding material. That is, the top cladding is "tuned" to provide desired optical characteristics (such as a particular refractive index) but is not necessarily "tuned" to provide the lowest possible birefringence as described in Ojha et al. or A. Killian et al.

Figure 1:
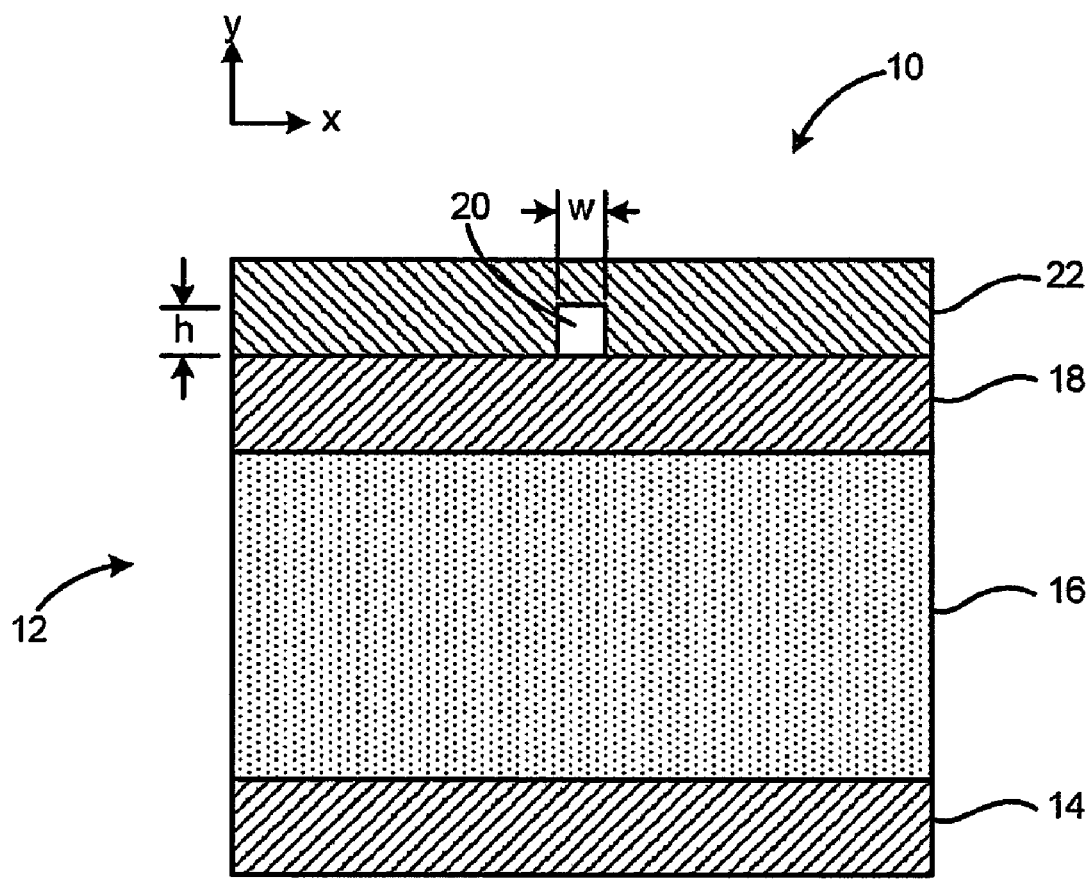
FIG. 1 shows a variation on a cross-section of a substrate upon which a representative waveguide and top cladding may be disposed.

A representative cross-section 10 of a substrate with a waveguide and top cladding is shown in FIG. 1. As seen in this variation, cross-section 10 may have a substrate 12, upon which waveguide 20 and top cladding 22 may be disposed. Substrate 12 may be comprised of up to several layers making up the substrate 12. Layer 14 may be a layer of, e.g., undoped $SiO_2$ (silica), ranging in thickness from about 15-30 μm, but is preferably about 15 μm. The thickness of a layer in this example is taken as the distance along the y-axis; likewise, the width of a layer in this example is taken as the distance along the x-axis.

A silicon substrate 16 may be placed upon layer 14 and preferably has a thickness of about 625 μm. Then layer 18 (lower cladding) may be deposited on silicon substrate 16 or formed by oxidizing the substrate in steam, for example. Layers 14 and 18 may be grown sequentially but are preferably grown simultaneously. Layer 18, like layer 14 may be comprised of, e.g., undoped $SiO_2$ (silica), and may likewise have a thickness ranging from about 15-30 μm, but is also preferably about 15 μm. In other examples, the substrate may include a glass or quartz substrate.

A core layer may then be deposited on top of layer 18 using, e.g., standard silica deposition techniques such as flame hydrolysis or plasma-enhanced chemical vapor deposition (PECVD). This core material may be comprised of, e.g., silica with a dopant such as Germanium and/or Phosphorus, and may preferably have a refractive index about 0.5-1% higher than the lower cladding 18 index. Alternatively, the core material may comprise a variety of polymer materials such as optical grades of polyacrylates, polymethacrylates, polysilicone, polyimide, epoxy, polyurethane, polyolefin, polycarbonate, polyamides, polyesters, etc., as well as a various copolymers thereof, such as acrylate-methacrylates, acrylic-silicones, epoxy-urethanes, amide-imides, etc. The core layer may range in thickness, h, from about 5-8 μm, but is preferably about 6 μm thick. The core layer may be patterned using, e.g., photolithography and reactive ion etching, and an intermediate hard mask layer, such as chrome may be used, to define a waveguide core 20 preferably having a rectangular cross section. Waveguide core 20 also has a width, w, which may be varied accordingly to reduce the birefringence, as described below in detail.

After core 20 is etched, a silica top cladding layer 22 may be deposited on the structure. Although top cladding 22 may be comprised of specified compositions to reduce birefringence, as discussed above, this may be an unreliable method because of the difficulty in producing a top cladding composition which yields the required physical properties. A typical top cladding 22 may be comprised of, e.g., $SiO_2$ doped with Boron, but the concentration range of such dopants may be limited. In one example, top cladding 22 is doped with, e.g., Boron, in a range of about 3-6% (wt.), which may provide adequate performance while exhibiting improved chemical stability of the material and hence easier, more robust manufacturing compared to dopant levels above or below the range of about 3-6% (wt.). For example, a concentration of Boron below about 3% may yield glass which is too viscous for manufacturing and a concentration of Boron above about 6% may yield to phase separation during manufacture, thereby causing the device to become more complicated to produce. Using a concentration of dopant between 3-6% (wt.) can be utilized or optimized by adjusting the minimum allowable gap between waveguides, adjusting the annealing schedules (e.g., adding more incremental deposit-anneal steps to achieve top clad, or reducing the total thickness of reflowable top-clad), properties and geometries of core-etch, surface chemistry, diffusion rates, thermal history, etc.

As part of the present invention, a table of illustrative material properties, i.e., elastic modulus, E, and coefficient of thermal expansion (CTE), are shown below in Table 1 for the purposes of discussion.

TABLE 1

Example of material properties in a variation of a waveguide.

| Waveguide element | E (GPa) | CTE ($\times 10^{-6}$ °C.$^{-1}$) |
|---|---|---|
| Top cladding | 44 | * |
| Waveguide core | 62 | 2 |
| Silicon (substrate) | 200 | 3.5 |
| Undoped SiO$_2$ | 70 | 1 |

* Discussed below.

During the manufacture of an AWG, the layers of material are typically produced at elevated temperatures or they may require high temperature treatment to ensure homogeneity. Processing temperatures may be as high as about 900° C. Upon cooling, stresses may become induced into the waveguide core 20 because of the differing CTE values between, e.g., layer 18 and top cladding 22, thereby resulting in undesired birefringence in light carried through core 20. According to the invention, varying the width, w, of the waveguide core 20 may be selected to reduce or eliminate birefringence for a given tuned top cladding 22 having a pre-existing dopant concentration. The CTE mismatch from ambient temperature to a device operating temperature may typically be ignored for the purposes of the present invention because of the minimal effect such a temperature change may have.

In calculating an optimal width for birefringence reduction for a given top cladding 22, a stress value may be induced within core 20 in its blanket form. This stress value is typically due to a CTE mismatch between the film and the substrate and may result in a curvature within the plane of the substrate. This curvature may be measured and from there, the stress in the core film may be calculated by the following equation (1):

$$\sigma_{core} = \frac{E_{sub}(t_{sub})^2}{6Rt_{core}} \quad (1)$$

where, $\sigma_{core}$=stress value induced in core 20 by a curvature of substrate 16;
$E_{sub}$=elastic modulus of the substrate 16;
$t_{sub}$=substrate thickness;
R=radius of curvature of a given wafer from which a device may be manufactured from according to the present invention;
$t_{core}$=waveguide core 20 thickness, h.

In one variation, an example using the values as illustrated in Table 1 and $t_{sub}$=625 µm in equation (1) may yield the following in equation (2):

$$\sigma_{core} = \frac{(200 \times 10^9)(625 \times 10^{-6})}{6(-22)(6 \times 10^{-6})} = -98 \text{ MPa} \quad (2)$$

Once calculated, the value of $\sigma_{core}$ may be substituted into the following equation (3) to calculate the CTE value, $\alpha_{core}$, of core 20:

$$\alpha_{core} = \alpha_{sub} - \frac{\sigma_{core}}{E_{core}(\Delta T)} \quad (3)$$

where,
$\alpha_{core}$=calculated CTE of core 20;
$\alpha_{sub}$=CTE of substrate 16;
$E_{core}$=elastic modulus of core 20;
$\Delta T$=temperature range through which the materials undergo.

Substituting the values from equation (2) and Table 1 may yield the following equation (4):

$$\alpha_{core} = (3.5 \times 10^{-6}) - \frac{-98 \times 10^6}{(62 \times 10^9)(-900)} \quad (4)$$
$$= 1.74 \times 10^{-6} \cong 2.0 \times 10^{-6} \text{ °C.}^{-1}$$

These calculations may be performed for each individual layer within cross-section 10 to obtain the stress and CTE values of each layer.

A stress value of top cladding 22 induced by CTE differences over the temperature range $\Delta T$, e.g., about 900° C. from manufacturing/processing temperature to ambient temperature, may also be calculated. As discussed above, if top cladding 22 were doped with a high concentration, e.g., about 9% (wt.) of Boron, a tensile stress may be induced in top cladding 22; on the other hand, if top cladding 22 were doped with a low concentration, e.g., about 3% (wt.) of Boron, a compressive stress or zero load may be induced in top cladding 22. In calculating the stress, the following equation (5) may be used:

$$\sigma_{tc} = E_{tc}(-\alpha_{tc} + \alpha_{sub})(\Delta T) \quad (5)$$

where,
$\sigma_{tc}$=stress value induced in top cladding 22 by CTE differences between top cladding 22 and substrate 16;
$\alpha_{tc}$=CTE of top cladding 22;
$\alpha_{sub}$=CTE of substrate 16;
$E_{tc}$=elastic modulus of top cladding 22;
$\Delta T$=temperature range through which the materials undergo.

Substituting in values from Table 1 for a variation where a top cladding 22 has a CTE of about, e.g., $\alpha_{tc}$=3.2×10$^{-6}$ °C.$^{-1}$, and undergoes a temperature change of about, e.g., $\Delta T$=900° C., may yield the following equation (6). Whereas, top cladding 22 having a CTE of about, e.g., $\alpha_{tc}$=4.0×10$^{-6}$ °C.$^{-1}$, may yield the following equation (7).

$$\sigma_{tc} = (44 \times 10^9)(-3.2+3.5)(-900)(\times 10^{-6}) = -12 \text{ MPa} \quad (6)$$

$$\sigma_{tc} = (44 \times 10^9)(-4.0+3.5)(-900)(\times 10^{-6}) = 20 \text{ MPa} \quad (7)$$

As discussed above, a difference in effective index for the TE and TM polarization states is a reason for the occurrence of PDW, as expressed in equation (8):

$$PDW = \lambda_{c(TM)} - \lambda_{c(TE)} \text{ where,} \quad (8)$$

$$\lambda_c = \beta \frac{\Delta L}{m} \quad (9)$$

$\lambda_c$=wavelength of light through waveguide core 20;
$\beta$=effective refractive index;
$\Delta L$=distance traveled by the light through waveguide core 20;
m=diffraction order.

Substituting equation (9) into equation (8) yields the following result in equation (10):

$$PDW = (\beta_{TM} - \beta_{TE}) \frac{\Delta L}{m} \quad (10)$$

Figure 2:
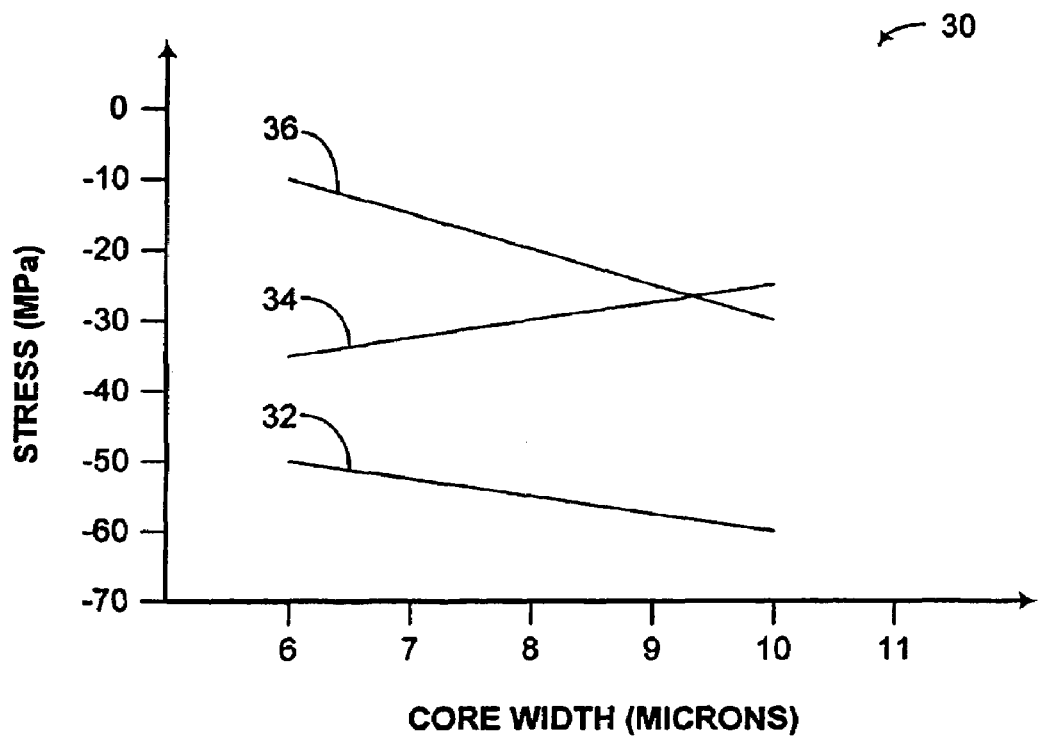
FIG. 2 shows an example of a chart where bi-directional stresses (MPa) in the top cladding are plotted against core width (μm).

The difference between $\beta_{TM}$ and $\beta_{TE}$ may be a result of differing stresses in the x- and y-directions along waveguide core 20. This difference may vary as the width, w, of core 20 varies. As seen in FIG. 2 in chart 30, stress (in MPa) induced in top cladding 22 may be plotted against core width (in μm) to see the relationship. Curve 32 represents the increasing absolute value of stress, $\sigma_x$, along the x-axis as the width, w, of core 20 increases. On the other hand, curve 34 shows a decreasing stress state, $\sigma_y$, along the y-axis as the width of core 20 increases. The overall stress state between $\sigma_x$ and $\sigma_y$ is shown in curve 36, where the stress state is shown to increase as core width increases.

In practice, stress calculations and stress distributions may be complex and are preferably solved through the use of computer simulations, e.g., finite element modeling/analysis, which may account for geometry, differences in material properties, and external factors such as temperature changes and forces. Given the different CTE and stress values for each of the layers, as described above, the stress distributions may be calculated over a range of varying core 20 widths, w, e.g., widths up to 11 μm and up. That is, thermal stress distributions in waveguide core 20 and surrounding cladding 22 may be calculated for each core 20 width over a range of widths.

Once the stress distributions are calculated, as described above, an index distribution may be calculated according to the following equations (11) and (12):

$$n_y(x,y)=n_{y0}(x,y)-c_1\sigma_y(x,y)-c_2[\sigma_z(x,y)+\sigma_x(x,y)] \quad (11)$$

$$n_x(x,y)=n_{x0}(x,y)-c_1\sigma_x(x,y)-c_2[\sigma_y(x,y)+\sigma_z(x,y)] \quad (12)$$

Constants $c_1$ and $c_2$ are stress optic coefficients where, e.g., $c_1=7.56\times10^{-7}$ MPa$^{-1}$ and $c_2=4.18\times10^{-6}$ MPa$^{-1}$; and where, e.g., $n_{xo}=n_{yo}=1.4455$ for top clad 22 and $n_{xo}=n_{yo}=1.455$ for core 20.

Properties such as refractive index can have complex distributions throughout a device and may be solved through computer simulation of the geometry, refractive indices, and absorption of the waveguide and cladding, as well as index change mechanisms, e.g., temperature changes, using commonly available photonic software such as BeamPROP, made by RSoft, Inc. of Ossining, N.Y. From such software tools and from the stress results and stress distributions, the effective refractive index may be found. With the results of refractive index distribution according to equations (11) and (12), the effective refractive index β may be calculated using, e.g., the BeamPROP simulation. This may be performed at least once for the TE mode ($n_x$ distribution) and at least once for the TM mode ($n_y$ distribution). Once the results of $\beta_{TM}$ and $\beta_{TE}$ have been calculated, PDW may finally be calculated with equation (10).

An example of another method of PDW reduction which varies the lengths of the relevant waveguides as well as utilizes the results of $\beta_{TM}$ and $\beta_{TE}$ may be found in the commonly-assigned U.S. patent application Ser. No. 09/870,876, entitled "Arrayed Waveguide Grating With Waveguides Of Unequal Widths" to Kenneth McGreer, filed on May 30, 2001 and which is incorporated herein by reference in its entirety.

Figure 3:
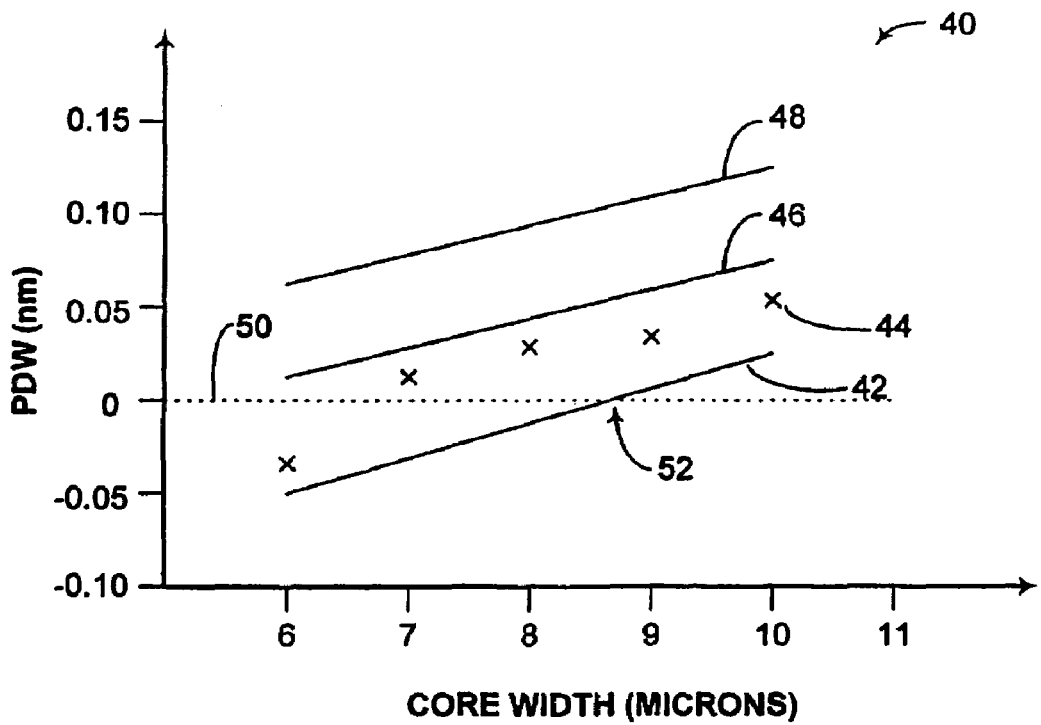
FIG. 3 shows an example of a chart where the resulting PDW (nm) is plotted against core width (μm) to obtain a core width which may result in a PDW of zero.

FIG. 3 illustrates the relationship in chart 40 between PDW (in nm) and core width (in μm) for a top cladding having several different CTE values. Curve 42 represents a variation where a top cladding 22 has a CTE of about $4.0\times10^{6\circ}$ C.$^{-1}$ and a resulting $\sigma_{ct}$ equal to about 20 MPa for a ΔT of about 900° C. Curve 46 represents another variation where top cladding 22 CTE is about $3.6\times10^{-6\circ}$ C.$^{-1}$ and a resulting $\sigma_{tc}$ equal to about 4 MPa. Likewise, curve 48 represents yet another variation where the CTE of top cladding 22 is about $3.2\times10^{-6\circ}$ C.$^{-1}$ and a resulting $\sigma_{tc}$ equal to about −12 MPa. As seen, as top cladding 22 CTE is lowered below that of substrate 16 (where CTE is about $3.5\times10^{-6\circ}$ C.$^{-1}$ in this variation), PDW generally increases. Data points 44 represent experimental results and are shown to show the close approximation and validity of the methods described above.

Boundary 50 represents a state where PDW is zero. Accordingly, for every top cladding 22 process, e.g., a high Boron concentration and high CTE or a low Boron concentration and low CTE, a corresponding width, w, for waveguide core 20, such as the width corresponding to intersection 52, may be found that results in a zero PDW state.

As described above, in calculating a width of a waveguide core that provides a desired birefringence for a given tuned top cladding composition, the distribution of stress in a top cladding over a change in temperature may be determined. From the distribution of stress, a relationship may be determined between polarization dependent wavelength and a width of the waveguide in the arrayed waveguide grating. From this relationship, the width of the waveguide may be selected such that the polarization dependent wavelength is minimized or reduced to a desired value to compensate for birefringence.

Figure 4:
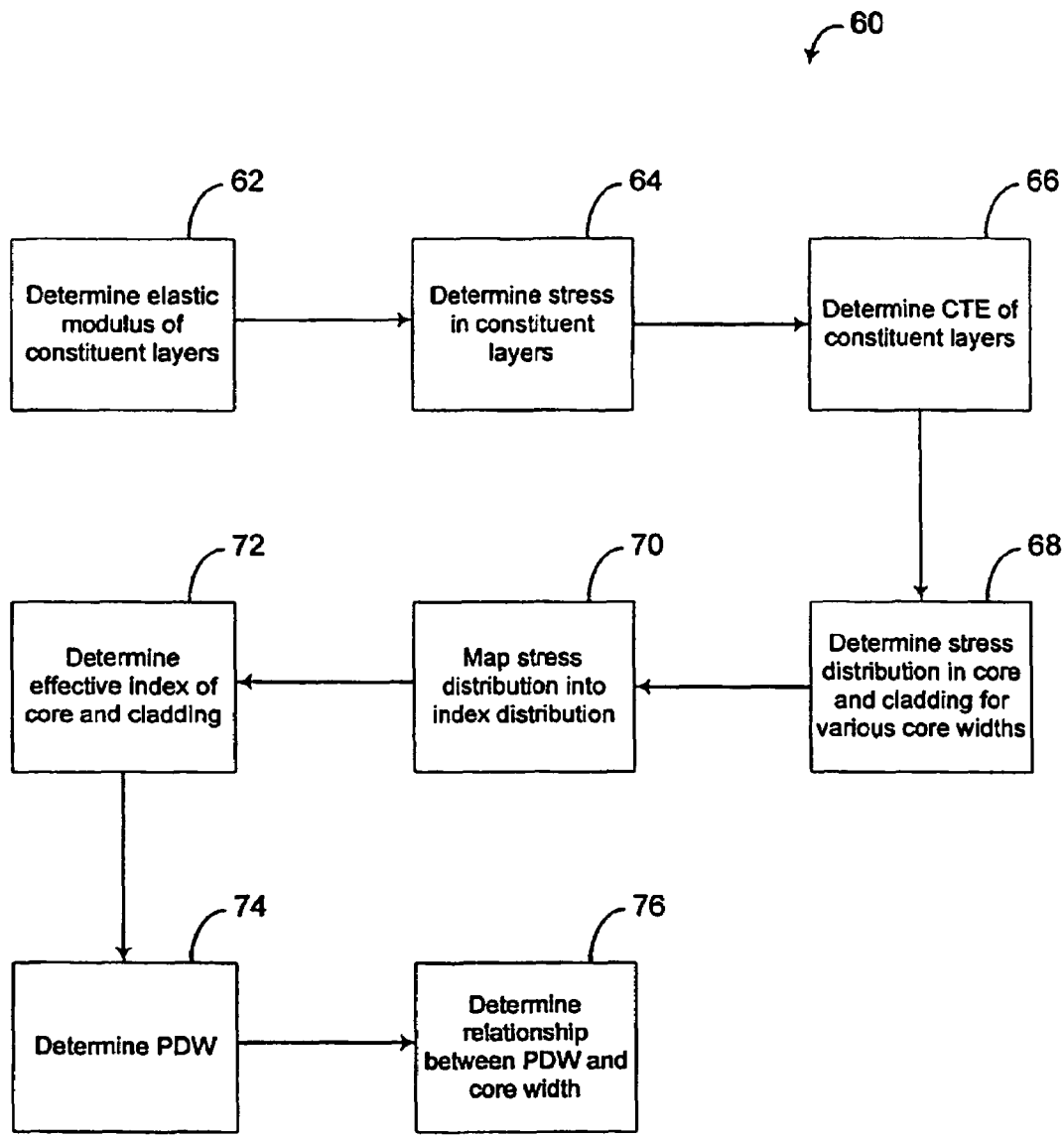
FIG. 4 shows a flow chart of one variation on a method of determining a waveguide width for a given top cladding.

A flow chart 60 is shown in FIG. 4 for one variation on a method of determining waveguide width for a given top cladding. Operation 62 may begin by determining an elastic modulus of each of the constituent layers, e.g., layers 14 to 22. This may be accomplished by measuring the modulus directly. Operation 64 may follow where a stress value may be determined in each of the layers, e.g., layers 14 to 22. In operation 66, the CTE values of each of the layers may be calculated by a method as described above. Operation 68 may follow where a stress distribution may be calculated in, e.g., core 20 and top cladding 22, for various core widths, w, to determine a thermal residual stress distribution due in part to CTE mismatches between different material types. Such calculations may be performed by computer simulations using, e.g., finite element modeling/analysis tools.

Operation 70 may follow where the stress distribution calculated in operation 68 may be mapped into an index distribution using a conventional stress optic coefficient. The index distribution may be determined by any of the methods as described above. Operation 72 may follow where an effective index of core 20 and top cladding 22 may be determined by simulations using, e.g., photonic software such as Beam-PROP. From the results of operation 72, a PDW may be calculated in operation 74 by a method as described above. Operation 76 may follow where a relationship between PDW and various core widths, w, may be determined by, e.g., plotting the results on a chart as described above. An appropriate core width may accordingly be selected in which PDW is minimized, i.e., results in zero, or near zero within about 3%, PDW for any given top cladding material by utilizing the methods described above.

The applications of the methods and apparatus discussed above are not limited to the numerical examples given or to the disclosed materials having specific CTEs, but may also include any number of further applications, e.g., different material types, different CTE values, etc. Modification of the above-described methods and apparatus for carrying out the invention, and variations of aspects of the invention that are obvious to those of skill in the art are intended to be within the scope of the claims.

We claim:

1. A method of controlling birefringence in an arrayed waveguide grating comprising:
   determining a stress distribution in a top cladding layer and in at least one waveguide in the arrayed waveguide grating over a change in manufacturing temperature, the top cladding layer having a dopant in the range of 3-6% by weight;

determining a relationship between polarization dependent wavelength and a width of the waveguide from the stress distribution; and selecting the width of the waveguide such that the polarization dependent wavelength is a predetermined value.

2. The method of claim 1 wherein the predetermined value is a minimized polarization dependent wavelength.

3. The method of claim 1 further comprising determining an elastic modulus of each of the top cladding layer and the waveguide prior to determining the stress distribution.

4. The method of claim 3 further comprising determining a coefficient of thermal expansion in each of the top cladding layer and the waveguide.

5. The method of claim 1 wherein determining the relationship between polarization dependent wavelength and the waveguide width from the stress distribution further comprises mapping the stress distribution into an index distribution.

6. The method of claim 5 further comprising determining an effective index of each of the waveguide and the top cladding.

7. The method of claim 1 wherein determining the relationship between polarization dependent wavelength and the waveguide width from the stress distribution further comprises determining a distribution of refractive index in the top cladding from the stress distribution.

8. The method of claim 2 wherein the minimized polarization dependent wavelength is zero.

9. The method of claim 1 wherein the top cladding layer is disposed over the waveguide.

10. The method of claim 9 wherein the top cladding layer is disposed over a substrate.

11. The method of claim 10 wherein the substrate comprises silicon.

12. The method of claim 10 wherein the substrate has a thickness of about 625 μm.

13. The method of claim 10 wherein the substrate is disposed over a first layer of $SiO_2$.

14. The method of claim 13 wherein a second layer of $SiO_2$ is disposed over the substrate.

15. The method of claim 1 wherein the waveguide further comprises at least one dopant.

16. The method of claim 15 wherein the at least one dopant is selected from the group consisting of Germanium and Phosphorus.

17. The method of claim 1 wherein the waveguide comprises at least one material selected from the group consisting of polyacrylates, polymethacrylates, polysilicone, polyimide, epoxy, polyurethane, polyolefin, polycarbonate, polyamides, polyesters, acrylate-methacrylate copolymers, acrylic-silicone copolymers, epoxy-urethane copolymers, and amide-imide copolymers.

18. The method of claim 1 wherein the dopant comprises Boron.

19. The method of claim 1 wherein the change in manufacturing temperature is about 900° C.

20. An arrayed waveguide grating manufactured according to the method of claim 1.

* * * * *